Sept. 23, 1947.   F. J. McMICHAEL   2,427,869
DEVICE FOR COOLING BY IMMERSION IN A CHILLED LIQUID
Filed Nov. 28, 1944   3 Sheets-Sheet 1
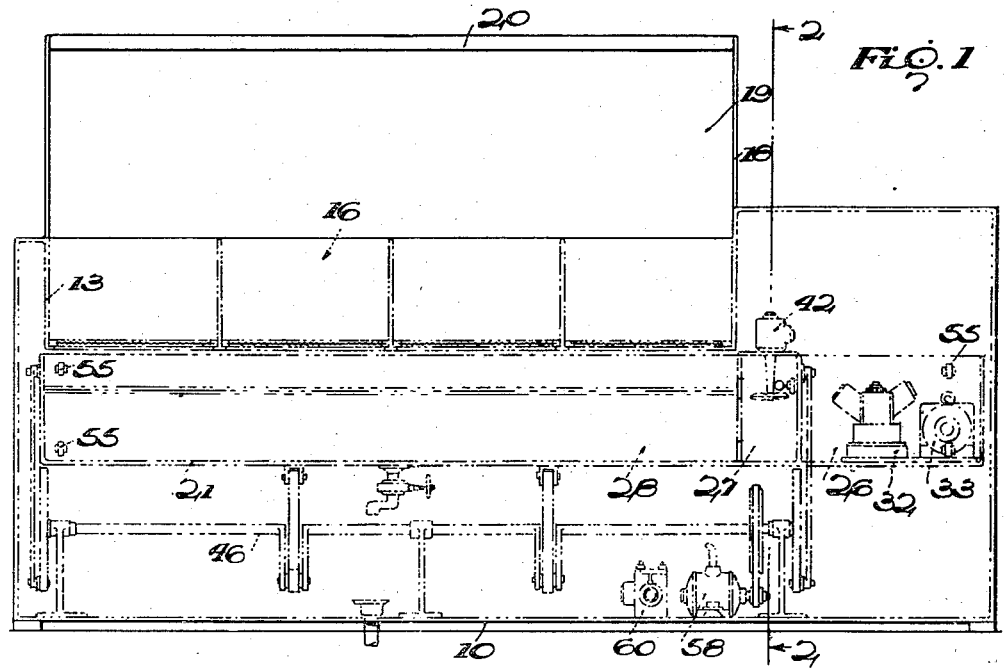
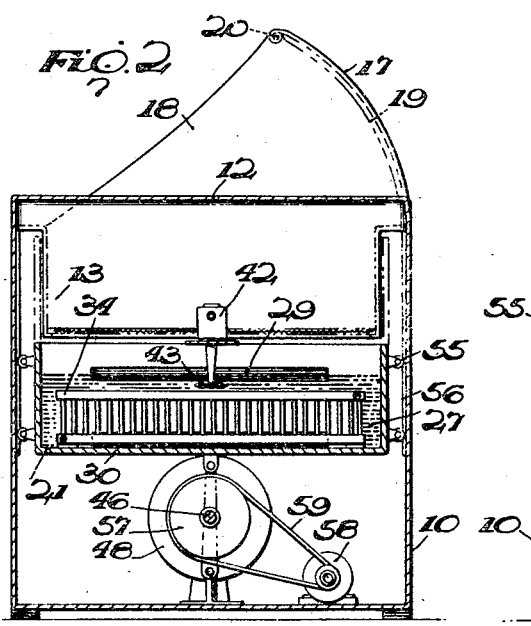
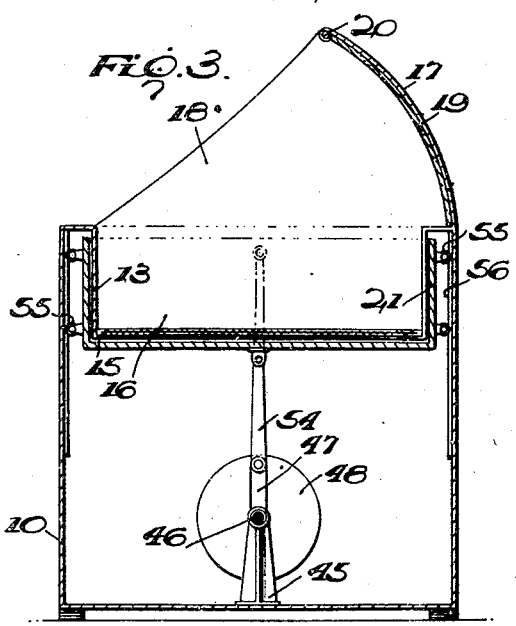
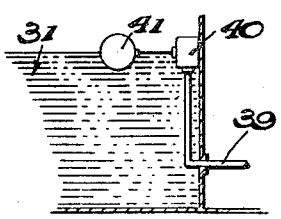
Inventor
Floyd J. McMichael
By Thos. N. Johnston
Attorney Sept. 23, 1947.  F. J. McMICHAEL  2,427,869
DEVICE FOR COOLING BY IMMERSION IN A CHILLED LIQUID
Filed Nov. 28, 1944  3 Sheets-Sheet 2

Inventor
Floyd J. McMichael
Thos. H. Johnston
Attorney

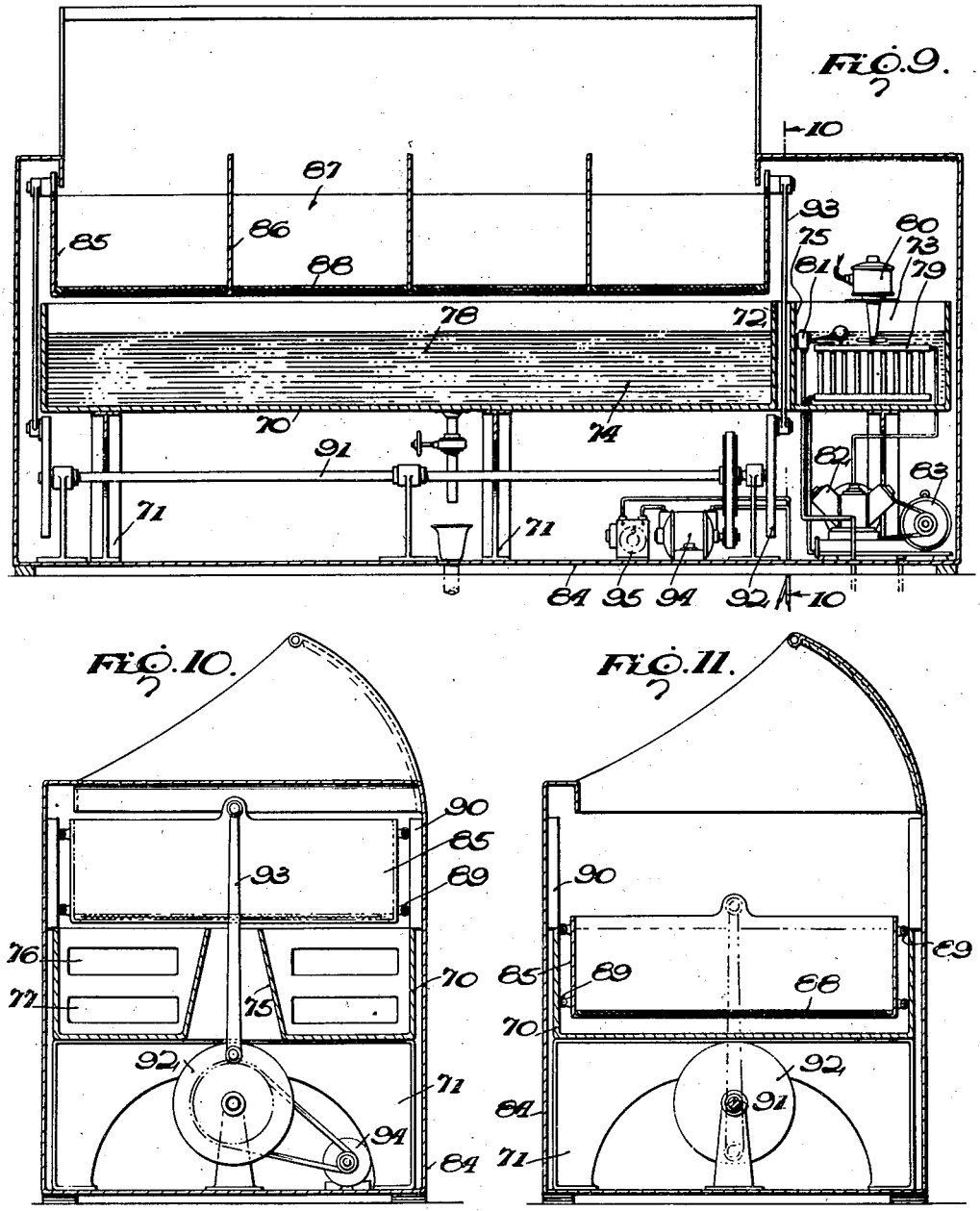

Patented Sept. 23, 1947

2,427,869

UNITED STATES PATENT OFFICE 2,427,869

DEVICE FOR COOLING BY IMMERSION IN A CHILLED LIQUID

Floyd J. McMichael, Orlando, Fla.

Application November 28, 1944, Serial No. 565,490

8 Claims. (Cl. 62—89.5)

This invention relates to an improved produce display unit especially adapted for use in markets, grocery stores, and the like for displaying green vegetables for convenient self-service by the customer.

In order that green vegetables on display may retain their fresh appearance and maximum food value, it is necessary that they be prevented from becoming dry, withered, or rendered limp by heat. To this end, the expedient of more or less covering the vegetables with cracked ice has heretofore been employed, but such practice is subject to the disadvantage that the ice tends to freeze into lumps and stick to the produce. Also, the expedient of refrigerating the produce with cold air has heretofore been tried, but in any such system, the vegetables soon become dry and withered. Further, the expedient of spraying the produce with cold water has heretofore been widely adopted, as being the simplest and easiest, but often the spray strikes the floor about the display trays to render the floor wet with the result that the customer dislikes to approach the trays. Moreover, an excess of water-spray tends to render the produce water-logged and slick.

It is therefore an object of the present invention to provide a display unit wherein the produce on display will be chilled and moistened by the application of cold water, without spilling the water, accidentally wetting the customer, or wetting the floor about the display unit.

A further object of the invention is to provide a display unit wherein cold water will be applied to the produce periodically, but wherein the application of the water may be rendered as infrequent as desired so that over-wetting of the produce may be avoided.

Still another object of the invention is to provide a display unit wherein the produce will be alternately immersed in the refrigerating water, and intermediately drained, to the end that the produce at the center of a pile thereof, as, for instance, a bin full of kale or spinach, will be wetted and chilled as thoroughly as the produce at the surface of the pile.

Another object of the invention is to provide a display unit wherein the produce will be immersed very slowly so that the water, instead of tending to wash the produce out of the bins therefor, as would result if the produce were immersed quickly, will gently overflow the produce and chill the same, and wherein the recession of the water will be caused to transpire with equal slowness.

And a still further object of the invention is to provide a display unit wherein, in one variation thereof, the refrigerating water will be raised and lowered to immerse and drain the produce, while, in another variation, the produce will be raised and lowered.

Other and incidental objects of the invention will appear during the course of the following description, and in the drawings:

Figure 1 is a front elevation of my improved display unit.

Figure 2 is a transverse, vertical section on the line 2—2 of Figure 1.

Figure 3 is a transverse, vertical section on the line 3—3 of Figure 4.

Figure 6 is a fragmentary detail showing the water supply valve employed.

Figure 9 is a vertical, longitudinal section showing a modification of the invention wherein the produce tray is raised and lowered.

Figure 10 is a transverse, vertical section on the line 10—10 of Figure 9 and showing the tray raised.

Figure 11 is a transverse, vertical section showing the tray lowered.

Figure 4:
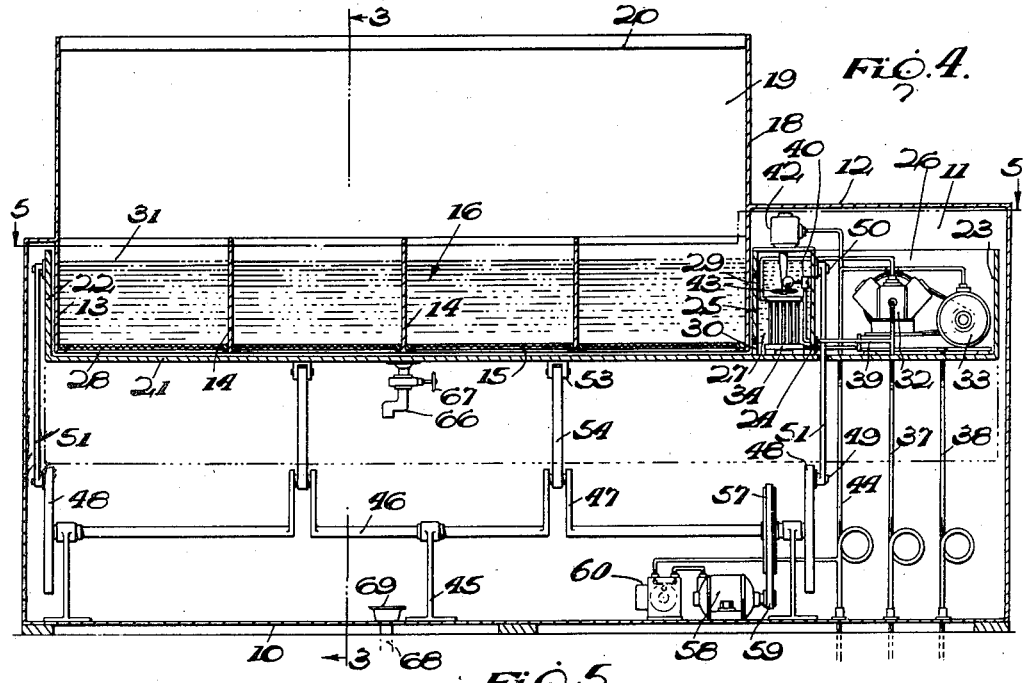
Figure 4 is a vertical, longitudinal section through the device.
Figures 7, 8:
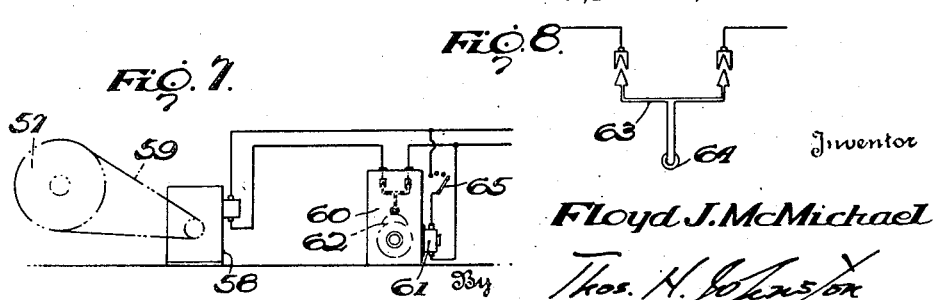
Figure 7 is a diagrammatic view of the drive motor and timer therefor.
Figure 8 is a diagrammatic detail of the timer switch.

In carrying the invention into effect, I employ an oblong casing 10 which may be of sheet metal or other approved material. This casing is somewhat higher at one end portion thereof than the other to provide a chamber 11 having a top wall 12 and, if so desired, said wall may be suitably hinged to facilitate access to said chamber. Depending within the casing at the top thereof in spaced relation to the walls of the casing is an oblong produce tray 13 which extends from the chamber 11 to a point near the end wall of the casing opposite said chamber. This tray may be integral with said walls, as shown, or, if preferred, detachably fixed thereto in any approved manner, and extending transversely of the tray are spaced partitions 14. As seen in Figures 2, 4 and 7 of the drawings, the side and end walls of the tray as well as the partitions are provided with appropriate bottom flanges, and resting on said flanges are foraminous bottom screens 15. A number of bins 16 are thus defined within the tray to receive different kinds of vegetables for display and, as will be appreciated, the screens 15 may be readily removed so that the bins as well as the screens may be thoroughly cleaned.

Rising from the back wall of the casing 10 throughout the length of the tray 13 is an upwardly and forwardly curved hood 17 having end walls 18. This hood will tend to prevent currents of air from striking the vegetables on display in the bins 16, and suitably mounted on the hood at the forward side thereof is a mirror 19 disposed at such an angle that a person standing in front of the display unit at a distance therefrom may see the vegetables reflected in the mirror. At the upper longitudinal edge of the hood 17 is a suitable, tubular electric lamp 20 appropriately mounted for illuminating the vegetables.

Mounted to reciprocate within the casing 10 is an oblong refrigerating pan 21. This pan is provided with end walls 22 and 23 respectively, as well as a partition wall 24, and a second partition wall 25 disposed near the wall 24. A machine compartment 26 is thus defined at one end portion of the pan between the end wall 23 and the partition wall 24, while a chilling compartment 27 is defined between the partition walls 24 and 25. Both of these compartments are received within the chamber 11 of the casing 10 for free movement therein as the pan reciprocates. Defined between the partition wall 25 and the end wall 22 of the pan is an immersing compartment 28 adapted to more or less snugly but freely receive the tray 13 so that the pan may move upwardly over the tray, and formed in the partition wall 25 is an upper inlet opening 29 and a lower outlet opening 30 connecting the compartments 27 and 28, the partition wall 24 being imperforate. Thus, a refrigerant 31 in the compartment 28 may enter the compartment 27 through the opening 29 and flow therefrom through the opening 30. Water is preferably used as a refrigerant.

Mounted within the compartment 26 of the pan 21 is a suitable compressor 32 adjacent which is arranged a motor 33 for driving the compressor, and mounted within the compartment 27 of the pan is a cooling unit 34 connected with the compressor by feed and return pipes 35 and 36 respectively. Thus, a refrigerating medium compressed by the compressor 32 will be fed to the unit 34 through the pipe 35 to return to the compressor through the pipe 36. The compressor 32, motor 33, unit 34 and associated parts may be elements of a system of any conventional character, of which there are several systems of the kind on the market. Leading through the bottom wall of the casing 10 is a flexible water supply conduit 37 connected to the compressor 32 for cooling the same, and leading from the compressor is a flexible drain conduit 38 providing a discharge for the water flowing through the compressor. Branching from the conduit 37 is a pipe 39 which, as seen in detail in Figure 6 of the drawings, enters the compartment 27 of the pan 21 and, at its upper end, carries a suitable float-controlled inlet valve 40 having a float 41. As will be understood, the float and valve will function to maintain the refrigerant 31 at a more or less constant level in the compartments 27 and 28 of the pan.

Mounted upon the partitions 24 and 25 of the pan 21 is a suitable motor-driven agitator 42 having blades 43 disposed over the cooling unit 34 below the level of the refrigerant 31 in the chamber 27, and leading through the bottom wall of the casing 10 to the motor of said unit as well as to the motor 33 of the compressor 32 is a flexible cable 44 for supplying current to said motors.

Thus, when the agitator 42 is in operation, the refrigerant 31 in the compartment 28 of the pan will be drawn in through the opening 29 of the partition wall 25 and then circulated over and around the cooling unit 34 within the compartment 27, when the refrigerant will be returned to the compartment 28 through the outlet 30. The refrigerant in the compartment 28 will accordingly be kept chilled and, of course, the compressor 32 and unit 34 will be of a capacity to maintain said refrigerant at the desired low temperature. As will be perceived, the flexible conduits 37 and 38 as well as the flexible cable 44 will accommodate the rise and fall of the pan 21.

Figure 5:
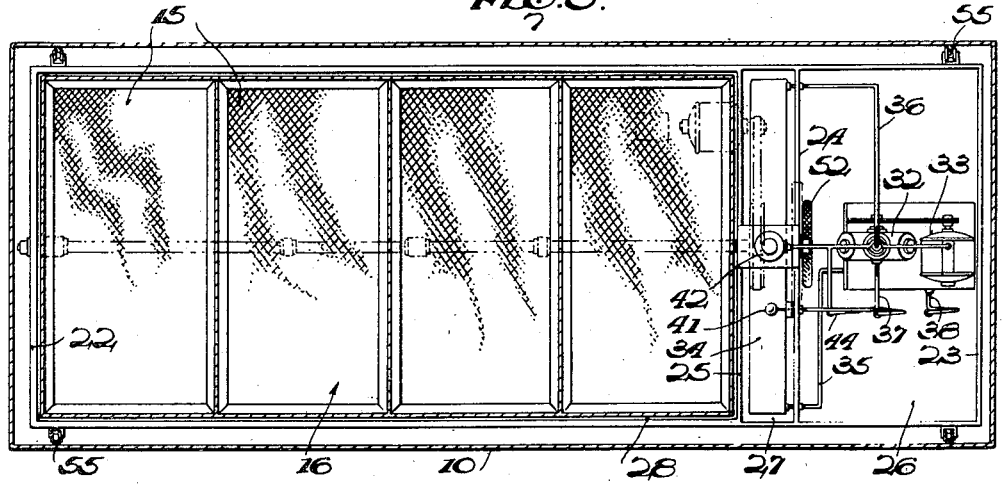
Figure 5 is a horizontal section on the line 5—5 of Figure 4.

Upstanding from the bottom wall of the casing 10 medially thereof are aligned pedestals 45 upon which is journaled a crank shaft 46 having cranks 47, and fixed to the end of said shaft are disks 48 which carry pins 49 having the same throw as the crank pins of the cranks 47. Mounted upon the end wall 22 of the pan 21 and upon the partition 24 medially of the pan and near the upper edge thereof are pins 50, and extending between said pins and the pins 49 of the disks 48 are connecting rods 51. As best seen in Figures 4 and 5 of the drawings, a slot 52 is provided in the bottom wall of the pan at the compartment 26 to accommodate the connecting rod attached to the partition wall 24. Fixed to the bottom wall of the pan in a plane with the pins 50 are spaced yokes 53, and extending between said yokes and the cranks 47 are connecting rods 54. Accordingly, as will be seen, rotation of the shaft 46 will cause the pan 21 to reciprocate, and fixed to the side walls of the pan near the ends thereof are pairs of vertically spaced rollers 55 coacting with the side walls of the casing 10 to guide the pan for rectilinear movement. If desired, tracks 56 may be provided for said rollers.

Mounted upon the crank shaft 46 near one end thereof is a pulley 57, and mounted upon the bottom wall of the casing 10 near said pulley is a motor 58 connected with the pulley by a suitable belt 59 for rotating the crank shaft. Mounted upon the bottom wall of the casing adjacent the motor 58 is a timer 60. As brought out in Figure 4 of the drawings, the motor 58 and timer 60 are supplied with current by the cable 44.

The timer 60 may be of any approved character but, as brought out in Figures 7 and 8 of the drawings, is shown as having a motor 61 which is connected across the circuit of the motor 58 and drives a cam 62 to coact with a switch 63 interposed in the circuit of the motor 58. Preferably, the stem of the switch is provided with an insulating roller 64 to engage the cam and said switch may be mounted to gravitate to open position or may be spring-pressed to open position. Thus, when the cam 62 lifts the switch to closed position, the motor 58 will function to rotate the shaft 46 and reciprocate the pan 21 as previously described while, when the switch 63 is open, the pan will remain stationary. Preferably, the motor 58 will be stopped when the pan is near the bottom of its throw.

Assuming now that the bins 16 of the tray 13 are filled with vegetables, it will be seen that when the motor 58 is started into operation, the pan 21 will be raised from the position shown in Figures 1 and 2 of the drawings to the position shown in Figures 3 and 4, when the tray will be received within the compartment 28 of the pan. As the pan ascends, the refrigerant 31 in the pan will accordingly be caused to enter the bins 16 through the screens 15 and rise about the vegetables until said vegetables are immersed when, as the pan descends, the refrigerant in said bins will then recede through the screens 15 to empty the bins of the refrigerant, after which the vegetables will be permitted to drain. The vegetables will thus be doused in cold water to prolong the freshness and attractive appearance thereof.

Preferably, the motor 58 will work through reduction gears so that the pan 21 will be raised very slowly and, likewise, will be lowered very slowly. Thus, the refrigerant 31 will be caused to gradually rise through the screens 15 about the vegetables and as gradually recede through said screens. The vegetables will thus not be washed out of the bins 16. Furthermore, the interval during which the vegetables are wholly or substantially immersed will be prolonged as the pan will approach the limit of its upward movement very slowly and descend with equal slowness. The refrigerant 31 will thus be afforded opportunity to permeate the piles of vegetables in the bins so that the vegetables at the centers of the piles will be drenched equally with the vegetables at the surface of said piles.

In connection with the upward movement of the pan 21, the necessity of circulating the refrigerant 31 downwardly through the chilling compartment 27, instead of upwardly therethrough, should be noted. As the pan ascends, the tray 13 will, as will be observed, first somewhat block the inlet opening 29 connecting the compartment 28 of the pan with said chilling compartment so that the flow of the refrigerant 31 into the chilling compartment will be correspondingly restricted. Likewise, as the pan reaches the end of its upward movement, the outlet opening 30 of the chilling compartment will be somewhat blocked by the tray, but as the inlet opening 29 will also be blocked at the same time, the blades 43 of the agitator 42 may then only churn the body of refrigerant in the chilling compartment, more or less, without raising the level of said body of refrigerant to flood the chilling compartment. If, on the contrary, the blades 43 of the agitator 42 operated to circulate the refrigerant upwardly through the chilling compartment 27, it will at once be seen that before the opening 30 became blocked, more refrigerant would be drawn into the chilling compartment 27 than could be discharged therefrom through the blocked opening 29 with the result that the chilling compartment would be flooded. It is therefore important that the refrigerant be circulated downwardly through the chilling compartment in the manner previously described.

Since it is desirable that the vegetables be immersed only infrequently, the timer 60 is provided. Preferably, the motor 61 of the timer will work through reduction gears so that the cam 62 will be rotated to close the switch 63 with corresponding infrequency. However, the motor 61 is of such character that the speed thereof may be varied and to this end a suitable switch 65 is provided. Thus, by selectively varying the speed of the motor, the length of the interval during which the switch 63 will remain open may be correspondingly varied to in turn vary the length of the period during which the pan 21 will remain lowered. In any event, it is intended that a considerable period of time will elapse between the periods that the motor 58 is energized so that the vegetables in the bins 16 will be immersed with corresponding infrequency. The cam 62 will, of course, be proportioned to hold the switch 63 closed long enough for the motor 58 to complete the cycle of raising and lowering the pan 21.

Leading from the bottom of the pan 21 is an outlet 66, and interposed in said outlet is a valve 67. Disposed opposite the discharge end of said outlet is a drain 68 at the upper end of which is a suitable trap 69. Thus, the tray 13 as well as the pan may be readily flushed and cleaned.

In Figures 9, 10 and 11 of the drawings, I have shown a variation of the invention wherein the refrigerating pan is stationary and the produce tray is raised and lowered. The pan is indicated at 70. This pan is mounted upon supports 71, and extending transversely of the pan near one end thereof is a partition wall 72 dividing the pan into a chilling compartment 73 and an immersing compartment 74. Rising through the compartment 73 is a duct 75 one side of which is formed by the partition wall 72, and formed in said wall are inlet and outlet openings 76 and 77 respectively, which openings are adapted to accommodate the flow of a refrigerant 78 downwardly through the chilling compartment.

The cooling unit is indicated at 79, the agitator at 80, and the float-controlled water supply valve at 81, all of these parts being identical with the corresponding parts first described and functioning in like manner. Since the pan is stationary, the compressor 82 and drive motor 83 for said compressor are mounted upon the bottom wall of the casing 84 instead of upon the pan, as in the preferred embodiment of the invention. The casing 84 corresponds, of course, to the casing 10, while the compressor 82 and motor 83 correspond to the compressor 32 and motor 33 first described and function in like manner. The refrigerant 78 in the pan will thus be kept chilled.

The produce tray is indicated at 85. This tray is adapted to be freely received in the compartment 74 of the pan 70 and is provided with partitions 86 defining bins 87 having removable bottom screen 88. Guiding the tray for rectilinear movement are rollers 89 disposed to coact with tracks 90 and with the side walls of the pan 70.

The tray 85 is reciprocated in the same way as the pan 21 first described and in the same manner. Mounted below the pan 70 is a shaft 91, and extending between disks 92 on the shaft and the ends of the tray are connecting rods 93, one of which, as will be observed, is accommodated by the duct 75 which is provided for the purpose. The shaft 91 is driven by a motor 94 corresponding to the motor 58, and controlling the motor 94 is a timer 95, corresponding to the timer 60. Thus, the tray 85 will be reciprocated for immersing in the refrigerant 78 vegetables in the bins 87. Otherwise, this variation of the invention is identical with the preferred embodiment thereof and further description is accordingly believed unnecessary.

Having thus described my invention, what I claim is:

1. A produce display unit including a casing, a tray arranged within the casing and adapted to receive produce for display, a refrigerating pan adapted to contain a refrigerant and formed to receive said tray therein immersing the produce in said refrigerant, means for maintaining said refrigerant chilled, the tray and pan providing complemental members one movable relative to the other within the casing for immersing said produce, means shiftably mounting said movable member, and means for shifting said movable member periodically.

2. A produce display unit including a casing, a tray arranged within the casing and adapted to receive produce for display, a refrigerating pan adapted to contain a refrigerant and formed to receive said tray therein immersing the produce in said refrigerant, means for maintaining said refrigerant chilled, the tray and pan providing complemental members one movable relative to the other within the casing for immersing said produce, means shiftably mounting said movable member, means for shifting said movable member periodically, and means for varying the frequency of the shifting of said movable member.

3. A produce display unit including a casing, a tray arranged within the casing and adapted to receive produce for display, a refrigerating pan adapted to contain a refrigerant and formed to receive said tray therein immersing the produce in said refrigerant, means for maintaining said refrigerant chilled, the tray and pan providing complemental members one movable relative to the other within the casing for immersing said produce, means disposed between the casing and said movable member to coact therewith for guiding the movable member for rectilinear movement, a drive shaft having crank pins, connecting rods extending between said pins and said movable member, and means for rotating said shaft and shifting said movable member.

4. A produce display unit including a casing, a tray arranged within the casing and adapted to receive produce for display, a refrigerating pan adapted to contain a refrigerant and formed to receive said tray therein immersing the produce in said refrigerant, means for maintaining said refrigerant chilled, the tray and pan providing complemental members one movable relative to the other within the casing for immersing said produce, means disposed between the casing and said movable member to coact therewith for guiding the movable member for rectilinear movement, a drive shaft having crank pins, connecting rods extending between said pins and said movable member, a motor for rotating said shaft and shifting said movable member, and a timer controlling the energization of said motor.

5. A produce display unit including a casing, a tray supported by the casing to depend therein and adapted to receive produce for display, a refrigerating pan adapted to contain a refrigerant and movable upwardly about the tray for immersing the produce in said refrigerant, means guiding the pan for rectilinear movement, and means for raising and lowering said pan.

6. A produce display unit including a casing, a tray supported by the casing to depend therein and adapted to receive produce for display, a refrigerating pan adapted to contain a refrigerant and movable upwardly about the tray for immersing the produce in said refrigerant, means guiding the pan for rectilinear movement, means for raising and lowering said pan, and means for varying the frequency of the movement of the pan.

7. A produce display unit including a casing, a tray supported by the casing to depend therein and adapted to receive produce for display, a refrigerating pan adapted to contain a refrigerant and movable upwardly about the tray for immersing the produce in said refrigerant, means for guiding the pan, means for raising and lowering the pan including a drive motor, and a timer controlling the energization of said motor.

8. A produce display unit including a casing, a refrigerating pan mounted within the casing and adapted to contain a refrigerant, a tray adapted to receive produce for display and movable downwardly into said pan for immersing the produce in said refrigerant, means for guiding the tray, means for raising and lowering the tray periodically, and means for varying the frequency of the movement of the tray.

FLOYD J. McMICHAEL.

REFERENCES CITED

The following references are of record in the file of this patent:

UNITED STATES PATENTS

| Number | Name | Date |
|---|---|---|
| 821,503 | Keith | May 22, 1906 |
| 1,692,672 | Loosley | Nov. 20, 1928 |
| 1,846,192 | Daniels | Feb. 23, 1932 |
| 2,303,000 | Ribble | Nov. 24, 1942 |